United States Patent
Ahmed

(10) Patent No.: US 11,768,933 B2
(45) Date of Patent: Sep. 26, 2023

(54) SYSTEM AND METHOD FOR PROTECTING AGAINST RANSOMWARE WITHOUT THE USE OF SIGNATURES OR UPDATES

(71) Applicant: Saudi Arabian Oil Company, Dhahran (SA)

(72) Inventor: Urfan Ahmed, Al Khobar (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 170 days.

(21) Appl. No.: 16/990,393

(22) Filed: Aug. 11, 2020

(65) Prior Publication Data

US 2022/0050896 A1   Feb. 17, 2022

(51) Int. Cl.
*G06F 21/55* (2013.01)
*G06F 21/56* (2013.01)
(Continued)

(52) U.S. Cl.
CPC .......... *G06F 21/552* (2013.01); *G06F 21/562* (2013.01); *G06F 21/74* (2013.01); *H04L 63/101* (2013.01); *G06F 2221/034* (2013.01)

(58) Field of Classification Search
CPC .............................. G06F 21/552; G06F 21/566
See application file for complete search history.

(56) References Cited

U.S. PATENT DOCUMENTS 9,596,250 B2    3/2017  Reddington
10,055,582 B1*  8/2018  Weaver ................ G06F 21/562
(Continued)

FOREIGN PATENT DOCUMENTS

JP       5955475 B1       7/2016
WO    WO-2018156800 A1 *  8/2018  .......... G06F 11/1451

OTHER PUBLICATIONS

"Aaron Zimba, et al., "Multi-stage crypto ransomware attacks: A new emerging cyber threatto critical infrastructure and industrial control systems," published Jan. 10, 2018, byScienceDirect, ICT Express 4 (2018) 14-18".

*Primary Examiner* — Ponnoreay Pich
(74) *Attorney, Agent, or Firm* — Leason Ellis LLP

(57) ABSTRACT

A cybersecurity solution for preventing malware from infecting a computing device or a computer resource on the computing device. The solution can include detecting a computer resource process running or attempting to run on an operating system and comparing details of the computer resource process against an authorized processes database containing details of previously run computer resources processes to determine if the computer resource process is running or attempting to run for a first time on the operating system. The solution can include adding, during a learning mode, the details of the computer resource process to the authorized processes database when it is determined that the computer resource process is running or attempting to run for the first time on the operating system, and suspending, during a protect mode, the computer resource process from running on the operating system when it is determined that the computer resource process is running or attempting to run for the first time on the operating system. The details of the computer resource process can include at least one of semaphore data, mutex data or atom data for the computer resource process.

17 Claims, 4 Drawing Sheets

(51) Int. Cl.
*H04L 9/40* (2022.01)
*G06F 21/74* (2013.01)

(56) References Cited

U.S. PATENT DOCUMENTS

| | | | |
|---|---|---|---|
| 10,169,586 B2 | 1/2019 | Maciejak et al. | |
| 10,509,905 B2 | 12/2019 | Gupta et al. | |
| 10,841,333 B2* | 11/2020 | Levy | H04L 63/145 |
| 2004/0098617 A1* | 5/2004 | Sekar | H04L 63/1425 |
| | | | 709/224 |
| 2004/0158730 A1* | 8/2004 | Sarkar | G06F 21/564 |
| | | | 713/188 |
| 2005/0091214 A1* | 4/2005 | Probert | G06F 21/57 |
| | | | 707/999.009 |
| 2006/0230454 A1* | 10/2006 | Achanta | G06F 21/562 |
| | | | 726/24 |
| 2007/0028294 A1* | 2/2007 | Yamamoto | H04L 63/1441 |
| | | | 726/2 |
| 2007/0094491 A1* | 4/2007 | Teo | G06F 21/577 |
| | | | 713/153 |
| 2007/0192863 A1* | 8/2007 | Kapoor | H04L 63/145 |
| | | | 726/23 |
| 2007/0294768 A1* | 12/2007 | Moskovitch | G06F 21/566 |
| | | | 726/24 |
| 2009/0064334 A1* | 3/2009 | Holcomb | H04L 63/1408 |
| | | | 726/24 |
| 2013/0111551 A1* | 5/2013 | Dellacona | G06F 21/85 |
| | | | 726/3 |
| 2014/0090061 A1* | 3/2014 | Avasarala | G06F 21/564 |
| | | | 726/24 |
| 2014/0150106 A1* | 5/2014 | Butler | G06F 21/565 |
| | | | 726/24 |
| 2014/0165207 A1* | 6/2014 | Engel | G06F 21/566 |
| | | | 726/25 |
| 2016/0212159 A1* | 7/2016 | Gupta | G06F 21/566 |
| 2016/0342787 A1* | 11/2016 | Wang | G06F 21/566 |
| 2017/0109509 A1* | 4/2017 | Baghdasaryan | G06F 21/316 |
| 2018/0018458 A1 | 1/2018 | Schmugar et al. | |
| 2018/0189490 A1* | 7/2018 | Maciejak | G06F 21/566 |
| 2018/0248896 A1* | 8/2018 | Challita | G06F 21/566 |
| 2018/0375885 A1* | 12/2018 | Chen | H04L 63/145 |
| 2019/0228153 A1* | 7/2019 | Scaife | G06F 21/6218 |
| 2019/0251259 A1* | 8/2019 | Stepanek | G06F 21/554 |
| 2020/0267170 A1* | 8/2020 | Mohanta | H04L 63/1425 |
| 2020/0293657 A1* | 9/2020 | Chai | G06F 21/554 |
| 2020/0296124 A1* | 9/2020 | Pratt | H04L 63/1416 |
| 2020/0401697 A1* | 12/2020 | Smith | G06F 21/566 |
| 2021/0168175 A1* | 6/2021 | Crabtree | G06F 16/2477 |
| 2021/0250364 A1* | 8/2021 | Webster | G06F 17/18 |
| 2022/0012336 A1* | 1/2022 | Lakkundi | G06F 21/564 |
| 2022/0050896 A1* | 2/2022 | Ahmed | H04L 63/101 |
| 2022/0398316 A1* | 12/2022 | Castrejon, III | G06F 21/566 |

* cited by examiner

SYSTEM AND METHOD FOR PROTECTING AGAINST RANSOMWARE WITHOUT THE USE OF SIGNATURES OR UPDATES

FIELD OF THE DISCLOSURE

The present disclosure relates to a cybersecurity solution comprising a system, a method and a computer program for detecting and preventing malware before it infects computer resources in a computing device or a computer network.

BACKGROUND OF THE DISCLOSURE

Ransomware is a type of malicious software or malware that prevents a victim from accessing computer resources such as files, systems, or networks and demands payment of a ransom for their return. Ransomware typically works by encrypting computer resources on the victim's computing device or computer network, thereby making them unusable, and demanding payment of a ransom in exchange for providing a key to decrypt the encrypted computer resources.

Starting around year 2012, ransomware attacks have grown internationally, targeting businesses, institutions, governments and just about any entity with a computer network. Although state and local governments have been particularly visible targets for ransomware attacks, ransomware actors have also targeted health care organizations, industrial companies, and the transportation sector, among others. Recently, however, ransomware attacks have become more targeted, sophisticated, and costly. Since early 2018, the losses from ransomware attacks have increased significantly, according to complaints received by the Federal Bureau of Investigation (FBI) case information.

There exists an urgent and critical need for a technological solution that can effectively protect computer resources on computing devices and computer networks from ransomware attacks.

SUMMARY OF THE DISCLOSURE

After extensive analysis of various ransomware, the inventor has discovered certain aspects that are common to most if not all ransomware. Based on those discoveries, the inventor has created a cybersecurity solution that comprises a system, a method and a computer program for detecting and preventing ransomware before it executes and encrypts computer resources in a computing device or a computer network. The instant disclosure provides non-limiting embodiments of this cybersecurity solution.

In a non-limiting embodiment of the cybersecurity solution, a computer-implemented method for preventing malware from infecting a computing device or a computer resource on the computing device comprises: detecting a computer resource process running or attempting to run on an operating system; comparing details of the computer resource process against an authorized processes database containing details of previously run computer resources processes to determine if the computer resource process is running or attempting to run for a first time on the operating system; adding, during a learning mode, the details of the computer resource process to the authorized processes database when it is determined that the computer resource process is running or attempting to run for the first time on the operating system; and suspending, during a protect mode, the computer resource process from running on the operating system when it is determined that the computer resource process is running or attempting to run for the first time on the operating system, wherein the details of the computer resource process include at least one of semaphore data, mutex data or atom data for the computer resource process.

The computer-implemented method can further comprise: initializing an internal timer for the learning mode or the protect mode; or terminating the computer resource process; or generating an alert for the computer resource process, including the details of the computer resource process.

The computer-implemented method can comprise: checking, during the protect mode, if the computing device is operating in a client-server mode; and generating an alert for the computer resource process, including the details of the computer resource process when the computing device is operating in the client-server mode.

The computer-implemented method can comprise: analyzing, during the protect mode, the details of the computer resource process; and terminating, during the protect mode, the computer resource process based on a result of the analysis.

The computer-implemented method can comprise analyzing, during the protect mode, the details of the computer resource process; and allowing, during the protect mode, the computer resource process to run on the operating system based on a result of the analysis.

The computer-implemented method can comprise adding, during the protect mode, the details of the computer resource process to the authorized processes database.

The computer-implemented method can comprise: sending, during the protect mode, the details of the computer resource process to another computing device for analysis; receiving an analysis result from said another computing device; and either terminating the computer resource process or allowing the computer resource process to run on the operating system based on the analysis result.

In the computer-implemented method, in the details of the computer resource process can include at least one of a process name, a file path, a cryptographic hash, or timestamp.

In the computer-implemented method, the malware can comprise crypto-ransomware.

In a non-limiting embodiment of the cybersecurity solution, a system for preventing malware from infecting a computing device or a computer resource on the computing device comprises: a processor running an operating system; an authorized processes database containing details of previously run computer resources processes; and a ransomware monitor configured to operate in a learning mode or a protect mode. The ransomware monitor can be arranged to: detect a computer resource process running or attempting to run on the processor; compare details of the computer resource process against the authorized processes database to determine if the computer resource process is running or attempting to run for a first time on the processor; add, during a learning mode, the details of the computer resource process to the authorized processes database when it is determined that the computer resource process is running or attempting to run for the first time on the operating system; and suspend, during a protect mode, the computer resource process from running on the processor when it is determined that the computer resource process is running or attempting to run for the first time on the processor.

In the system, the details of the computer resource process can include at least one of semaphore data, mutex data or atom data for the computer resource process.

In the system, the details of the computer resource process can include at least one of a process name, a file path, a cryptographic hash, or timestamp.

In the system, the authorized processes database can include a computing resource process whitelist.

In the system, the authorized processes database can include a mutex table containing a mutex value for each of the previously run computer resources processes.

In the system, the authorized processes database can include a semaphore table containing a semaphore value for each of the previously run computer resources processes.

In the system, the authorized processes database can include an atom table containing an atom value for each of the previously run computer resources processes.

The system can comprise an internal timer arranged to be set to a learn time value or a protect time value.

In the system, the ransomware monitor can be arranged to: check, during the protect mode, if the computing device is operating in a client-server mode; and generate an alert for the computer resource process, including the details of the computer resource process when the computing device is operating in the client-server mode.

In the system, the ransomware monitor can be arranged to: send, during the protect mode, the details of the computer resource process to another computing device for analysis; receive an analysis result from said another computing device; and either, based on the analysis result, terminate the computer resource process or allow the computer resource process to run on the processor.

Additional features, advantages, and embodiments of the disclosure and, therefore, the cybersecurity solution, may be set forth or apparent from consideration of the detailed description and drawings. Moreover, it is to be understood that the foregoing summary of the disclosure and the following detailed description and drawings provide non-limiting examples that are intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description explain the principles of the disclosure. No attempt is made to show structural details of the disclosure in more detail than may be necessary for a fundamental understanding of the disclosure and the various ways in which it may be practiced.

Figure 1:
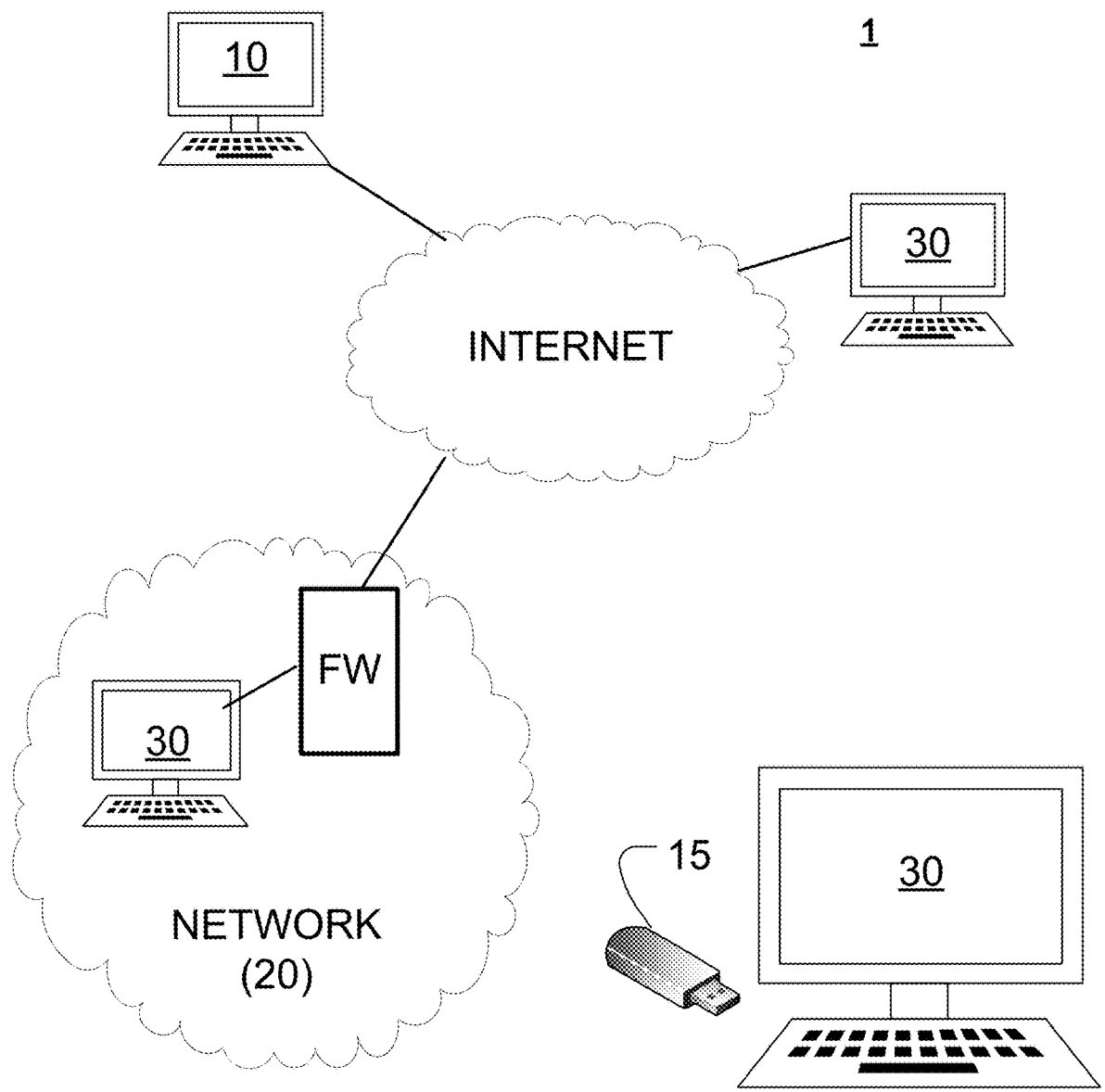
FIG. 1 shows a non-limiting example of a user environment that can be provided with the cybersecurity solution.

The present disclosure is further described in the detailed description that follows.

DETAILED DESCRIPTION OF THE DISCLOSURE

The disclosure and its various features and advantageous details are explained more fully with reference to non-limiting embodiments and examples described or illustrated in the accompanying drawings and detailed in the following description. It should be noted that features illustrated in the drawings are not necessarily drawn to scale, and features of one embodiment can be employed with other embodiments as those skilled in the art would recognize, even if not explicitly stated. Descriptions of well-known components and processing techniques can be omitted so as not to unnecessarily obscure the embodiments or examples of the disclosure. The examples used are intended merely to facilitate an understanding of ways in which the disclosure can be practiced and to further enable those skilled in the art to practice the embodiments of the disclosure. Accordingly, the examples and embodiments should not be construed as limiting the scope of the disclosure. Moreover, it is noted that like reference numerals represent similar parts throughout the several views of the drawings.

FIG. 1 depicts a non-limiting example of a user environment 1 that can be provided with the cybersecurity solution. In the user environment 1, a malicious actor can introduce ransomware in any of a number of ways, including via a computing device 10 or a computer-readable medium 15. The ransomware can be delivered via a communication link to one or more target computing devices 30, which can be connected to the Internet directly or through a firewall (FW) on a network 20. The ransomware can be delivered directly to the target computing device 30, such as, for example, by inserting the computer-readable medium 15 containing ransomware into the computing device 30

A cyber-criminal, for example, using the computing device 10 or the computer-readable medium 15 can deliver ransomware to the target computing device 30 and infect computer resources on the target computing device 30 or computer resources to which the target computing device 30 connects, accesses or otherwise interacts with, such as, for example, computer resources on the computer network 20. The cyber-criminal might upgrade or change attack vectors or techniques to make the attacks more effective and to prevent detection. For instance, the cyber-criminal might infect a target computing device 30 with ransomware using email phishing campaigns, Remote Desktop Protocol (RDP) vulnerabilities, or vulnerabilities in the computer resources on the target computing device 30.

In email phishing campaigns, the cyber-criminal might send an email containing a malicious file or link, which deploys malware on the target computing device 30 when clicked by a recipient. Cyber-criminals have historically used generic, broad-based spamming strategies to deploy their malware, while recent ransomware campaigns have been more targeted. The cyber-criminal might also compromise a victim's email account by using precursor malware, which enables the cyber-criminal to use the victim's email account to further spread the infection to other computing devices 30 or computer resources, such as, on the network 20.

The Remote Desktop Protocol (or RDP) is a proprietary network protocol that can allow an individual to control computer resources and data of the target computing device 30 over the Internet. Cyber-criminals have used both brute-force methods, such as, for example, using trial-and-error to obtain user credentials, and credentials purchased on darknet marketplaces to gain unauthorized RDP access to victim systems. Once they have RDP access, cyber-criminals can deploy a range of malware—including ransomware—to the victim systems.

In other instances, cyber-criminals have taken advantage of security weaknesses or vulnerabilities in computer resources such as widely used software programs to gain control of the target computing device 30 and deploy ransomware. For example, cyber-criminals recently exploited vulnerabilities in two remote management tools used by managed service providers (MSPs) to deploy ransomware on the networks of customers of at least three MSPs.

While a robust system of patches and backups can be an important and effective defense for any computing device or computer network against ransomware attacks, it is insufficient to defend against attacks using unknown, new or altered ransomware, thereby leaving the target computing devices 30 and computer network 20 vulnerable to catastrophic risks posed by such malware. The various embodiments of the cybersecurity solution described in this disclosure can stop such ransomware attacks and others before they can do any damage to the computer devices 30, the network 20 or the users that rely on those computer resources.

The cybersecurity solution takes advantage of vulnerabilities that exist in ransomware to thwart attacks. In a non-limiting embodiment, the cybersecurity solution recognizes a characteristic of ransomware is that it can only run once on an operating system of a computing device. This is due to the nature of ransomware—namely, encrypting data once and demanding payment for a decryption key. Crypto-based ransomware cannot run twice or else the decryption key will not work. To prevent a second execution of the ransomware, it uses operating system process suspending mechanisms to prevent this from happening, including mutexes, semaphores or atom tables.

The cybersecurity solution can be configured to the particular target computing device 30, computer network 20 or computer resources in or connected to the computing device 30 or computer network 20. The cybersecurity solution can be configured to work in a client-client, peer-to-peer (P2P) or client-server arrangement. For instance, in the client-server arrangement, the cybersecurity solution can suspend computer resource (CR) processes that are not already pre-approved until the processes are checked and approved or denied.

The cybersecurity solution can be arranged to toggle between a "learning mode" and a "protect mode," as discussed below.

Operating systems in computing devices 30 can use built-in data structures such as mutexes, semaphores and atom (SMA) tables (or "SMA structures") to help computer resource (CR) processes executing on the operating systems determine if they are already running. The cybersecurity solution can monitor those built-in functions, record what can be considered normal during the "learning mode" and prevent new execution of computer resource processes when the cybersecurity solution determines a CR process is not approved during the "protect mode" by analyzing the CR process's SMA structure and checking if is authorized or approved to run on the operating system. Accordingly, ransomware can be prevented from infecting the target computing device 30 (and computer network 20) as the SMA structure will not be present in the computing device 30 when the ransomware CR process attempts to run on the operating system.

A mutex lock (or "mutual exclusion lock" or "mutex") is a synchronization mechanism used by an operating system, such as, for example, in the target computing device 30, to enforce limits on access to a resource (for example, a section of computer program code) where there are many threads of execution. In other words, the mutex lock is a global object that coordinates multiple CR processes and threads to enforce a mutual exclusion concurrency control policy. Basically, the mutex lock makes certain that only a single thread is executing a particular resource (for example, section of computer program code) at a time.

In an operating system kernel, the mutex lock is commonly referred to as a "mutant". Mutexes often use hard-coded names that can be used to identify malware. The mutex allows access to a single thread at a time, requiring any subsequent thread that attempts to gain access to wait. When the accessing thread is finished, it releases the mutex lock.

A semaphore lock is a variable or abstract data type used to control access to a common resource by multiple CR processes in a concurrent system such as a multitasking operating system. The semaphore can be a variable. This variable can be used to solve critical section problems and to achieve process synchronization in a multiprocessing environment. The semaphore can be a plain variable that is, for example, incremented or decremented, or toggled between two values (for example, "1" and "0"), depending on programmer-defined conditions.

An atom (or atomic) table is a global table that is available to all CR processes in the target computing device 30. When a CR process places a string in the global atom table, the atom will be unique throughout the system. This table can be shared amongst the CR processes in the target computing device 30. The atom table can contain an atom value for each previously run computer resource process. The atom table can be contained in, for example, the authorized processes database (discussed below).

Like the mutex lock, the semaphore lock and atom table can be used by an operating system, such as, for example, in the target computing device 30, to control access to a common resource, such as, for example, a section of computer program code.

Regardless whether a lock is in the form of a mutex or a semaphore, or the computing device 30 uses an atom table, it typically requires hardware support for efficient implementation. This support usually takes the form of one or more atomic instructions such as, for example, "test-and-set", "fetch-and-add" or "compare-and-swap". These instructions can allow a single computer resource process to test if the lock or resource is free, and if free, acquire the lock in a single atomic operation.

An atomic operation is one that cannot be divided into smaller parts. Atomic operations can be critically important when handling shared resources on an operating system. At its most basic level, an atomic operation is an operation performed by the operating system that is isolated from all other operations that might be executed concurrently.

Figure 2:
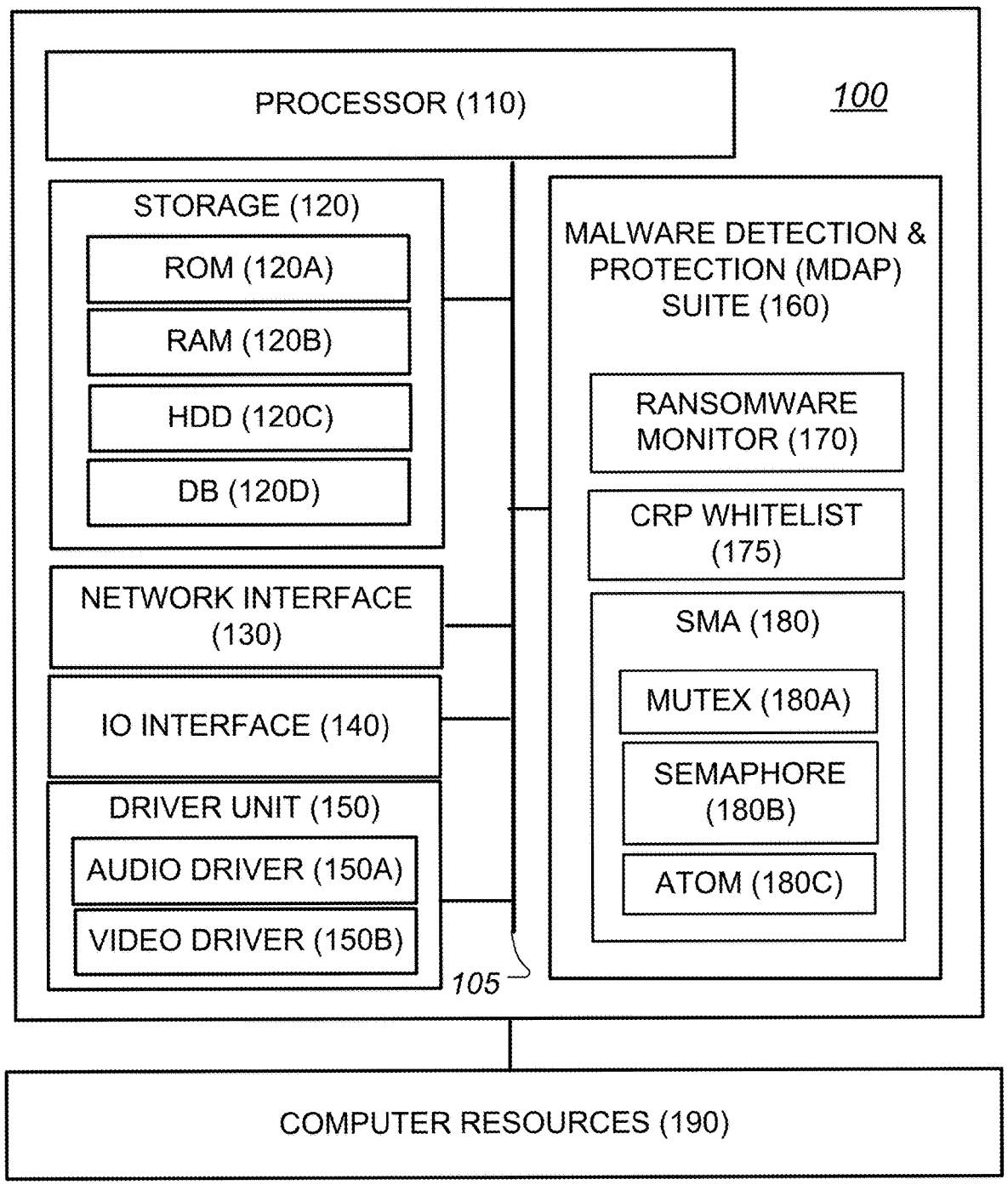
FIG. 2 shows a non-limiting embodiment of a cybersecurity system, constructed according to the principles of the disclosure.

FIG. 2 depicts a non-limiting embodiment of a cybersecurity system 100, constructed according to the principles of the disclosure. Each of the target computing devices 30 can include the system 100. The system 100 can include a processor 110, a storage system 120, a network interface 130, an input-output (IO) interface 140, a driver unit 150 and a malware detection and protection (MDAP) suite 160. The cybersecurity system 100 can include a modem (not shown), a transmitter (not shown), a receiver (not shown), or a transceiver (not shown). The system 100 can include a bus 105 that can connect to each of the components 110 to 160 in the system 100 via one or more communication links. The bus 105 can be connected to a plurality of compute resources 190, which can be located in the system 100 or elsewhere in the computing device 30. The computer resources 190 can include computer resources that are external to the computing device 30 and accessible or connected to the computing device 30 or cybersecurity system 100.

Any one or more of the components 120 to 160 can include a computing device or a computing resource that is separate from the processor 110, as seen in FIG. 2, or integrated or integrateable in a computing device such as the processor 110.

The system 100 can be connected to a plurality of computer resources 190 in the target computing device 30 or on the computer network 20, as seen in FIG. 2. Alternatively, the system 100 can include the computer resources 190. Any or all of the computer resources 190 can be a potential target of crypto-ransomware.

In a non-limiting embodiment (not shown) the components 110 to 150 and 190 can be located in the target computing device 30 or computer network 20 and the MDAP suite 160 can be added to or installed in the target computing device 30 as a computing resource or a computing device, or as a suite of computing resources or computing devices.

The processor 110 can include any of various commercially available processors, including for example, a central processing unit (CPU), a graphic processing unit (GPU), a general-purpose GPU (GPGPU), a field programmable gate array (FGPA), an application-specific integrated circuit (ASIC), a manycore processor, multiple microprocessors, or any other computing device architecture. The processor 110 can include the processor (not shown) in the target computing device 30, such as, for example, an existing microprocessor or multiprocessor in the computing device 30.

The processor 110 can be arranged to run an operating system (OS), which can include an operating system (OS) kernel to control all operations on the cybersecurity system 100. The OS kernel can include, for example, a monolithic kernel or a microkernel. The OS kernel can be arranged to execute on the processor 110, or a processor (not shown) in the MDAP suite 160, and have control over operations in the system 100. The OS or OS kernel can be contained in the storage 120 (or the MDAP suite 160) and executed by the processor 110. The OS or OS kernel can be cached in a RAM 120B (discussed below). The OS kernel can represent the highest level of privilege on the OS or the processor 110. The OS can include a driver for each hardware device included in the system 100.

The OS can be arranged to use a data structure such as the SMA structure, which can comprise a mutex table, a semaphore table, or an atom table to help computer resource processes ("CRP" or "CR process") executing on the operating systems determine if they are already running. The MDAP suite 160 can be arranged to monitor those functions, record (or log) what can be considered normal during the "learning mode" and prevent new execution of a CRP when the MDAP suite 160 determines an SMA structure of the CRP is not approved or authorized to run on the OS during the "protect mode." Accordingly, ransomware can be prevented from infecting computer resources on the target computing device 30 (or computer network 20), including computer resources 190, as the SMA structure will not be present.

In a non-limiting embodiment, any or all of the components 170 to 180 can be integrated with the operating system.

The processor 110 (or MDAP suite 160) can be arranged to store information about instantiated CR processes, including, for example: instantiated process name, instantiated process identification number and instantiated process canonical path; cryptographic hash of process (for example, SHA256); process instantiation verification data, including, for example, process name, identification number and canonical path; SMA table data, including mutex, semaphore or atomic data; timestamps; event notifications; and CRP whitelist data. The SMA table data can be stored in an SMA 180 data structure, which can be located in the MDAP suite 160. The CRP whitelist data can be stored in a CRP whitelist 175, which can be located in the MDAP suite 160. The CRP whitelist can include a list or table of all CRPs that are approved or authorized to run on the operating system in the processor 110 (or MDAP suite 160).

The OS kernel can be arranged to allocate resources or services to, and enable computing resources or CRPs to share or exchange information, protect the resources or services of each computing resource or CRP from other computing resources or CRPs, or enable synchronization amongst the computing resources or CRPs.

The OS kernel can, when a CRP is triggered in the target computing device 30, initiate and carry out the CR process for that computer resource, including allocating resources for the CR process, such as, for example, hard disk space, memory space, processing time or space, or other services on one or more hardware devices (not shown). The OS kernel can carry out the CR process by allocating memory space and processing resources to the CR process, loading the corresponding computing resource (or portion of computing resource) into the allocated memory space, executing instructions of the computing resource on the OS kernel, or interfacing the CR process to one or more computer resources.

The OS kernel can be arranged to facilitate interactions between the computing resources or CRPs. The processor 110 (or MDAP suite 160), which runs the OS, can be arranged to arbitrate access to services and resources by the CR processes, including, for example, running time on the processor. The OS kernel can be arranged to take responsibility for deciding at any time which of one or more CR processes should be allocated to any of the resources. The OS kernel can be arranged to determine whether a request from a CR process is appropriate or authorized, such as, for example, a request to access or run a resource (for example, section of computer code) or service on the OS, or to access a computer resource (such as, for example, memory space, a data file, an executable file, or a library), connect to the Internet, or view configuration data.

The OS kernel can be arranged to maintain a data structure for each computing resource in the target computing device 30 (shown in FIG. 1), including the computer resources 190. The data structure can include, for example, a description of the state and resources or services owned by each computing resource, thereby enabling the OS kernel to exert control over each computing resource and corresponding CR process. The OS kernel can include, in addition to the SMA data structure, a data structure such as, for example, Process Control Block (PCB), Thread Controlling Block (ThCB), Task Controlling Block (TCB), Task Struct, Switchframe or any other data structure suitable for the OS kernel to manage each of the CR processes for the computing resources, including runtime scheduling, memory access, input/output (I/O) interface access or performance monitoring.

For each computing resource, the data structure can include, for example, CRP identification data, CRP state data, and CRP control data to uniquely identify each corresponding CR process when running on the OS kernel. The OS can reference the data structure for CRP when determining whether to allow the CR process to access, run or connect to a resource or service, so as to, for example, encrypt a computer resource in the target computing device 30 (shown in FIG. 1), including one or more of the computer resources 190. The CR process identification data can include a process identifier (or PID) such as commonly used in operating system kernels in, for example, UNIX, macOS® or Windows®, to uniquely identify each CR process running on the OS kernel. The CR process identification data can be used by the OS kernel as a process parameter in function calls, runtime scheduling, mutex locks, semaphore controls, atom calls, termination, or other actions related to the CR process.

In a non-limiting embodiment, the OS kernel can be arranged to access or modify the data structure (for example, PCB) when managing or executing CR processes, including scheduling, memory access, input-output (I/O) interface access, or performance monitoring. The OS kernel can create or update an SMA table for each CR process. The OS kernel can be arranged to prevent any changes or write instructions during the "protect mode" to the SMA table. The OS kernel can create or update, for example, a memory table, an input-output (I/O) device table, and a process table, such as, for example, during the "learning mode." The memory table can include, for example, information about the allocation of main or virtual memory for each CR process, and authorization attributes for accessing memory areas shared among different CR processes running on the OS kernel.

The cybersecurity system 100 can include a non-transitory computer-readable storage medium that can hold executable or interpretable computer program code or instructions that, when executed by the processor 110 (or a processor (not shown) in the MDAP suite 160), causes the steps, processes or methods in this disclosure to be carried out. The computer-readable storage medium can be included in the storage 120.

The storage system 120 can be arranged as one or more computing devices or computing resources. The storage system 120 can include a read-only-memory (ROM) 120A, a random-access-memory (RAM) 120B, a hard disk drive (HDD) 120C and a database (DB) 120D. The storage 120 can include the non-transitory computer-readable storage medium that can hold the executable or interpretable computer program code or instructions that are executable on the processor 110 (or in the MDAP suite 160), to cause the steps, processes or methods in this disclosure to be carried out. The computer-readable storage medium can be included in, for example the HDD 120C. The computer-readable storage medium can include the operating system, including OS kernel. The computer-readable storage medium can include the MDAP suite 160 in a non-limiting embodiment where the MDAP suite 160 consists solely of computer resources.

A basic input/output system (BIOS) can be stored in a non-volatile memory in the storage 120, such as, for example, the ROM 120A, which can include, for example, a ROM, an EPROM, or an EEPROM. The BIOS can contain the basic routines that help to transfer information between components in the system 100, such as during start-up.

The RAM 120B can include a high-speed RAM such as a static RAM (SRAM) or non-volatile random-access memory (NVRAM) for caching data.

The HDD 120C can include, for example, a hard disk drive (HDD), an optical disk drive (ODD), an enhanced integrated drive electronics (EIDE) drive or a serial advanced technology attachments (SATA) drive. The HDD 120C can include a read/write from/to a CD-ROM disk (not shown), or, read from or write to other high capacity optical media such as a digital versatile disc (DVD). The HDD 120C can be arranged for external use in a suitable chassis (not shown). The HDD 120C can be arranged to connect to the bus 105 via a hard disk drive interface (not shown) or an optical drive interface (not shown). The hard disk drive interface (not shown) can include a Universal Serial Bus (USB) (not shown) or an IEEE 1394 interface (not shown) for external applications. In a non-limiting implementation, the HDD 120C can include the MDAP suite 160.

The DB 120D (or HDD 120C) can be arranged to store data, event logs, and logs of instantiated CR processes, including, for example, instantiated CR process name, instantiated CR process identification number, instantiated CR process cryptographic hash and instantiated CR process canonical path. The DB 120D can be arranged to store CR process instantiation verification data (including, for example, CR process name, CR identification number, CR process cryptographic hash and CR canonical path), timestamps, event logs, and the CRP whitelist. The CRP whitelist, which can include an authorization database, can contain an inventory of all CR processes that are authorized or approved to run on or interact with the OS. The DB 120D can be arranged to include the SMA 180 data structure, including the mutex 180A, semaphore 180B and atom 180C. Records or data in the DB 120D can be cached in the RAM 120B during processing.

The DB 120D can be arranged to be accessed by any one or more of the components 110 to 160 in the system 100. The DB 120D can be arranged to receive a query and, in response, retrieve specific data, data records or portions of data records based on the query. A data record can include, for example, a file or a log. The DB 120D can include a database management system (DBMS) that can interact with the components 110 to 160. The DBMS can be arranged to interact with the computer resources 190, such as, for example, in the target computing device 30 (shown in FIG. 1). The DBMS can include, for example, SQL, NoSQL, MySQL, Oracle, Postgres, Access, or Unix. The DB 120D can include a relational database.

The DB 120D can be arranged to contain information about each computer resource in the computing device 30 (shown in FIG. 1), including computer resources 190. The DB 120D can contain, for example, configuration data, Internet Protocol (IP) address, media access control (MAC) address, policies, or rules. The database 12D can be arranged to store the records of: operating systems or OS kernels; instantiated CR processes, including, for example, instantiated CR process name, instantiated CR process identification number, instantiated CR cryptographic hash and instantiated CR process canonical path; CR process instantiation verification data, including, for example, CR process name, identification number, CR cryptographic hash and canonical path; SMA table data, including mutex, semaphore or atomic data; timestamps; event logs; and CRP whitelists.

The storage 120, including non-transitory computer-readable media, can be arranged to provide nonvolatile storage of data, data structures, and computer-executable instructions. The storage 120 can accommodate the storage of any data in a suitable digital (or analog) format. The storage 120 can include one or more computing resources such as, for example, program modules or software applications that can be used to execute aspects of the architecture included in this disclosure. The computer resources 190 can be contained in the storage 120.

The network interface 130 can be arranged to connect to the computer network 20 or the Internet (shown in FIG. 1). The network interface 130 can be arranged to connect to computer resources (not shown) on the computer network 20 or the Internet. The network interface 130 can include a wired or a wireless communication network interface (not shown) or a modem (not shown). When used in a LAN, the network interface 130 can be arranged to include a wired or wireless communication network interface that can connect to the LAN; and, when used in a wide area network (WAN), the network interface 130 can be arranged to include a modem to connect to the WAN network. The modem (not shown) can be internal or external and wired or wireless. The modem can be connected to the bus 105 via, for example, a serial port interface (not shown).

The IO interface 140 can be arranged to receive commands or data from an operator (not shown) or one or more of the components 110 to 130 or 150 to 190. The IO interface 140 can be arranged to connect to or communicate with one or more input/output devices (not shown), including, for example, a keyboard (not shown), a mouse (not shown), a pointer (not shown), a microphone (not shown), a speaker (not shown), or a display (not shown). The received commands or data can be forwarded from the IO interface 140 as instruction or data signals via the bus 105 to any component in the system 100.

The driver unit 150 can include an audio driver 150A and a video driver 150B. The audio driver 150A can include a sound card, a sound driver (not shown), an interactive voice response (IVR) unit, or any other device necessary to render a sound signal on a sound production device (not shown), such as for example, a speaker (not shown). The video driver 150B can include a video card (not shown), a graphics driver (not shown), a video adaptor (not shown), or any other device necessary to render an image signal on a display device (not shown).

The computer resources 190 can include all or a subset of all computer resources in the target computing device 30 (shown in FIG. 1), including for example, data, data files, executable files, computer programs, library files or any other computer readable data or computer executable instructions or code.

The computer resources 190 can include an application program, an application program interface (API), a computer program module, or program data. The computing resource 190 can include an API such as, for example, a web API, a simple object access protocol (SOAP) API, a remote procedure call (RPC) API, a representation state transfer (REST) API, or any other utility or service API. One or more of the computing resources 190 can be cached in the RAM 120B as executable sections of computer program code or retrievable data.

In the non-limiting embodiment seen in FIG. 2, the MDAP suite 160 includes a suite of computing devices or computer resources.

In an alternative embodiment (not shown), the MDAP suite 160 can be implemented as one or more computer resources that are executable by the processor 110. In that embodiment, the MDAP suite 160 can be stored, for example, in the storage 120. The MDAP suite 160 can be downloaded to or installed on the target computing device 30, which can be located at a node in the computer network 20, as seen in FIG. 1.

In other embodiments (not shown), the MDAP suite 160 can be implemented with a computing device (not shown) and an operating system running on the computing device. The MDAP suite 160 can be arranged to be Windows® based, Unix based, mobile-based or web browser-based. The MDAP suite 160 can be implemented as a software-as-a-service (SaaS) platform.

The MDAP suite 160 can include a ransomware monitor 170, the computing resource process (CRP) whitelist 175 and the SMA data structure 180. The SMA data structure 180 can include the mutex 180A, the semaphore 180B and the atom 180C, any of which can be arranged as a table or list in a database. The CRP whitelist 175 can be provided as an authorized processes database. The authorized processes database can include the SMA data structure 180, including mutex, semaphore and atom (SMA) values for all CRPs that previously ran on the OS.

The ransomware monitor 170 can be arranged to check and enumerate all CR processes running on the OS kernel. The ransomware monitor 170 can be arranged to monitor and enumerate every CR process running on or interacting with the OS kernel, including the CR process's file path (including, for example, canonical path), process name, process cryptographic hash and process identification number, which can be generated by the OS kernel for each CR process. The ransomware monitor 170 can be arranged to generate process instantiation verification data for each CR process that requests a mutex lock, semaphore or atomic lock.

The CR process instantiation verification data can include process parameters, such as, for example, the CR process name, canonical path, process cryptographic hash, and identification number for each corresponding CR process running on the OS kernel.

The ransomware monitor 170 can be arranged to compare the CR process parameters in the CR process instantiation verification data, including, for example, process name, process cryptographic hash, and canonical path, for each CR process against records of instantiated CR processes to determine whether the CR process corresponding to the process parameters has been previously seen by the OS kernel, which can be referred to as an "instantiated process." The CRP records can be stored in the storage 120 (or in the MDAP suite 160) and each record can include a plurality of fields corresponding to each process parameter, process cryptographic hash, including a process name field, a process identification number field and a canonical path field. Each CRP record can include SMA data and authorization or approval data.

The CRP whitelist 175 can include an authorization database or library of all CR processes that are authorized or approved to run on the OS. The authorization database can be included in the MDAP suite 160 (as seen in FIG. 2) or in the DB 120D. The CRP whitelist 175 can be arranged to interact with the processor 110 and ransomware monitor 170 to update the records in the authorization database with new entries, including the CR process instantiation verification data and a timestamp for each CR process running or requesting access to a resource or service on the OS or OS kernel. The timestamp can include a date and time when, for example, the corresponding CR process requested a mutex lock, semaphore or atomic lock.

The CRP whitelist 175 can include a list of CR process names and the relevant semaphore, mutex and atom table (SMA) that is associated with the CR process, including the canonical address. The CRP whitelist 175 can include a crypto-hash such as, for example, a sha-256 hash. Although the SMA 180 can be separate from the CRP whitelist 175, as seen in the non-limiting embodiment shown in FIG. 2, in other embodiments the SMA 180 can be included in the CRP whitelist 175, or together with the CRP whitelist 175 in the storage 120. In this regard, the mutex 180A, semaphore 180B and atom 180C can be provided as tables or lists in the CRP whitelist 175.

The ransomware monitor 170 can be arranged to generate an event notification when it determines that one or more CR process parameters (for example, the CR process name, process cryptographic hash and canonical path) in the process instantiation verification data does not match data in the corresponding data fields in the records of instantiated CR processes stored in the CRP whitelist 175 (or authorization database). The ransomware monitor 170 can be arranged to compare the nonmatching processes parameter(s) (for example, CR process name, process cryptographic hash and canonical path) against the authorization database in the CR whitelist 170 and generate an event log when it determines that the CR whitelist does not include any approved or authorized CR processes that match the process parameters in the process instantiation verification data. The event log can include an indication that the unmatched CR process corresponding to the process parameters was an unauthorized CR process and, therefore, might include malicious code or malware running on the OS kernel that can expose the computing device 30 or network 20 to a ransomware attack.

The ransomware monitor 170 can be arranged to interact with the storage 120 and CRP whitelist 175 or SMA 180 and update the records or data with new record (or log) entries or data, including the CR process instantiation verification data and timestamp for the CR process that is running, attempting to run or access a resource or service on the OS, including, for example, a mutex lock, semaphore or atom. The ransomware monitor 170 can be arranged to record or log the event in the event log, including the CR process instantiation verification data and timestamp. Events of interest that take place on the OS are recorded in the event log. The event log can be maintained by the OS and specific events cannot be deleted.

The ransomware monitor 170 can be arranged to monitor the SMA data structures of CR processes running in the target computing device 30, such as, for example, in the OS running on the processor 110, and record (or log) CR processes that are run during the "learning mode." When the ransomware monitor 170 switches to the "protect mode," each new CR process that runs or attempts to run on the OS can be analyzed and checked against the CRP whitelist 175 to determine whether it is authorized or approved to run; and, if it is determined that CR process is not authorized to run on the OS or OS kernel, that CR process is suspended and the event logged. The event log can be analyzed and evaluated automatically (or manually by a human operator) to determine whether the particular CR process should be approved or denied, such as, for example, in the client-server mode.

Figure 3A:
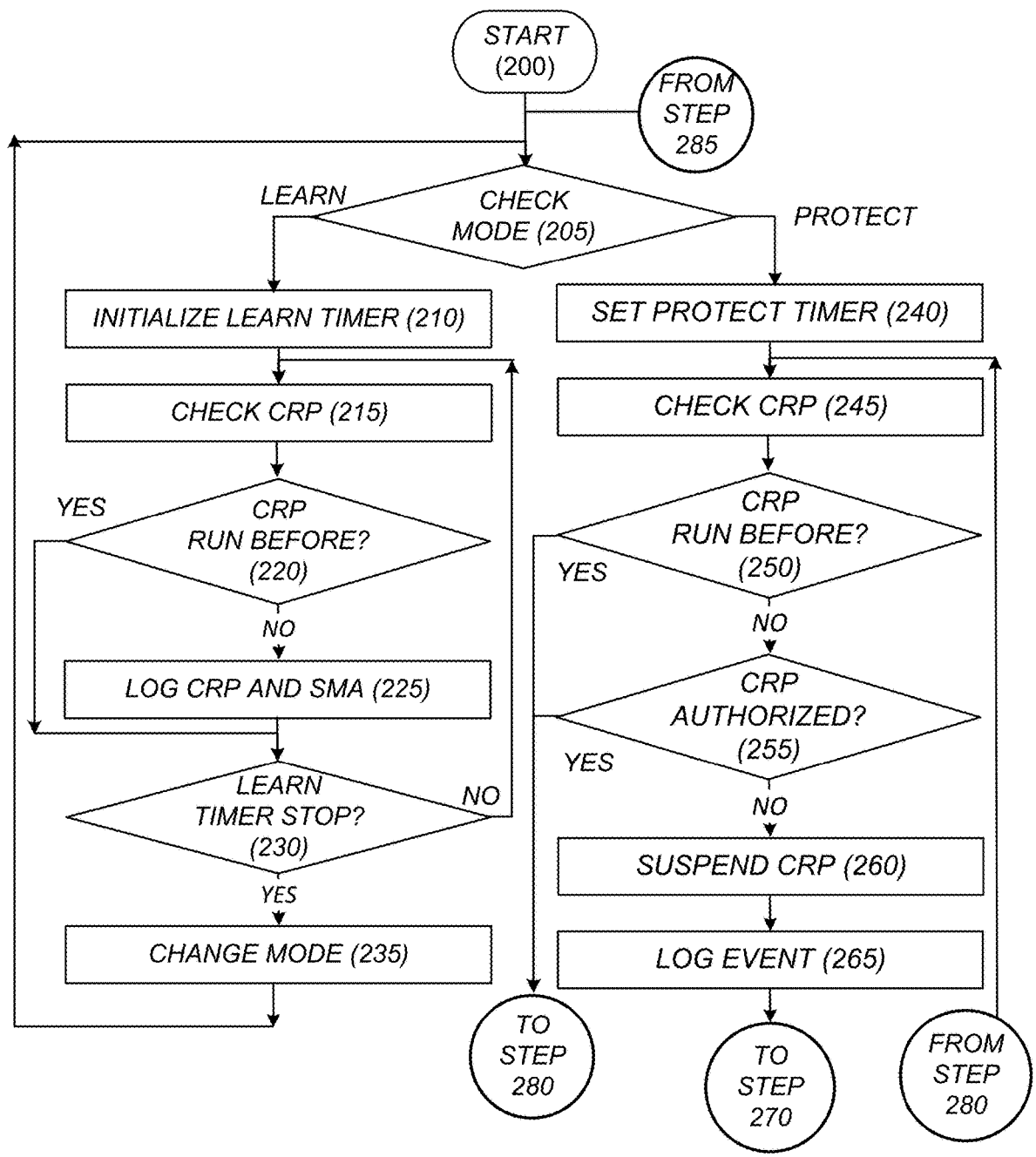
FIGS. 3A and 3B show a non-limiting embodiment of a cybersecurity threat remediation process, according to the principles of the disclosure.
Figure 3B:
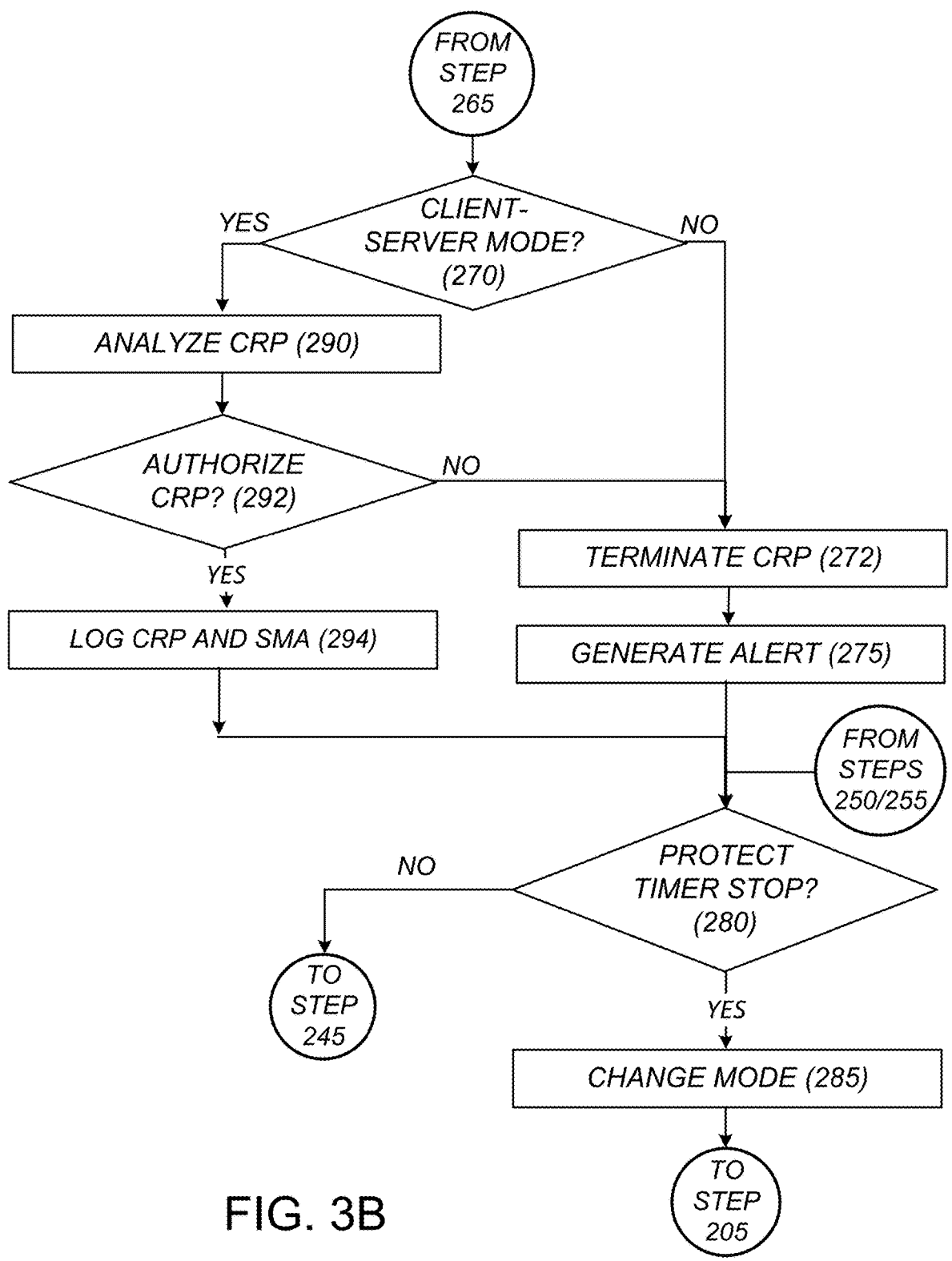

FIGS. 3A and 3B depict a non-limiting embodiment of a cybersecurity threat remediation process 200, according to the principles of the disclosure. The process 200 can be carried out by the cybersecurity system 100 (shown in FIG. 2), such as, for example, by the processor 110 and MDAP suite 160. After the process 200 initializes on the processor 110, the operation mode can be checked to determine if the process is running in the "learning mode" or "protect mode" (Step 205), for example, by the processor 110 (or ransomware monitor 170).

If it is determined that the process 200 is operating in the "learning mode" ("LEARN MODE" at Step 205), then an internal clock or timer can be initialized for the "learn mode" (Step 210), otherwise the timer can be initialized for the "protect mode" (Step 240). The learn timer (Step 210) can be set to, for example, less than 30 days, 30 days, 60 days, 90 days, or more than 90 days, and the protect timer (Step 240) can be set to, for example, less than 31 days, 31 days, 61 days, 91 days, or more than 91 days. The protect time can be whenever the learning timer ends. However, the protect mode can be switched back to learning mode after software (CR) updates, patches or installation of new applications (CR). The learn timer (Step 210) or protect timer (Step 240) can be set to any other time period deemed appropriate by one of ordinary skill in the art, depending on factors such as, for example, risk tolerance of the computing device 30 (or network 20) or its operator, whether and how frequently the computing device 30 is made accessible to or accesses the Internet, the criticality of the computer resources 190 (shown in FIG. 2) or the computing device 30 to an enterprise or operator, the level of exposure and the types of cyberattack vectors the computing device 30 might be vulnerable or exposed to, among other factors.

Learn Mode

After the learn timer is set and initialized (Step 210), each computing resource process (CRP) running on the operating system can be checked (Step 215), for example, by the ransomware monitor 170 (shown in FIG. 2), and a determination can be made whether each CRP has run before on the operating system or was previously authorized (Step 220). If it is determined that all CRPs running on the OS have previously run on the OS (YES at Step 220), or were previously authorized, then the learn timer can be checked to determine if it has finished or expired (Step 230).

Each CRP running on or attempting to run on the OS can be checked by the ransomware monitor 170 (Step 215) by checking the SMA for each CRP against existing SMAs in the SMA 180 data structure. Any CRP for which matching SMA data is not found in the SMA 180, the CRP can be checked against the CRP whitelist 175, which can include a database containing CRP names and hash matches for CRPs approved or authorized to run on the OS.

If a CRP process running or attempting to run on the OS is determined to be running for the first time on the OS and, for example, was not previous authorized (NO at Step 220), then the semaphores, mutex, and atom names (SMA) for the CRP can be logged and stored in the SMA 180 (Step 225). Additionally, the CRP's canonical path, name, and signature (for example, SHA-256 hash) can be stored, for example, in the CRP whitelist 175 (shown in FIG. 2). The semaphore, mutex and atom data for the CRP can be stored in the semaphore 180B, mutex 180A and atom 180C, respectively (shown in FIG. 2).

The mutex 180A can include a table or list of unique mutex names, each corresponding to a CRP that has previously run on the OS during the "learning mode" or been approved to run on the OS (for example, in Step 292, shown in FIG. 3B).

The semaphore 180B can include a table or list of semaphore values or names, each of which can correspond to a CRP that has previously run on the OS during the "learning mode" or been approved to run on the OS (for example, in Step 292, shown in FIG. 3B).

The atom 180C can include a table or list of unique strings (or atoms) placed in the global table or list by CRPs that previously ran on the OS during the "learning mode" or been approved to run on the OS (for example, in Step 292, shown in FIG. 3B). The global table in the atom 180C can be shared amongst the CRPs.

After the CRP and its SMA data are stored (Step 225), a determination can be made, for example, by the ransomware monitor 170, whether the learn timer has finished or expired (Step 230). If it is determined that the learn timer has not expired (NO at Step 230), then the next CRP attempting to run or running on the OS can be checked, for example, by the ransomware monitor 170 (Step 215).

If, however, it is determined that the learn timer has expired or finished (YES at Step 230), then the operation mode can be changed to "protect mode" and all writing to the CRP whitelist 175 and SMA 180 can be disabled or blocked (Step 235).

Protect Mode

After the protection timer is set and initialized (Step 240), each CRP running on or attempting to run on the operating system (OS) can be checked (Step 245), for example, by the ransomware monitor 170 (shown in FIG. 2), and a determination made whether each CRP has run before on the OS (Step 250).

If it is determined that all CRPs running on or attempting to run on the OS have previously run on the OS (YES at Step 245), then the protect timer can be checked to determine if it has finished or expired (Step 280), otherwise (NO at Step 250) a determination can be made whether the CRP is authorized or approved to run on the OS (Step 255). The determination can be made, for example, by the ransomware monitor 170 interacting with the CRP whitelist and checking the CRP against the database containing CRP names or hashes of CRPs authorized or approved to run on the OS (Step 255).

If a match is determined in the CRP whitelist 175 for the CRP (YES at Step 255), then the protect timer can be checked to determine if it has finished or expired (Step 280), otherwise (NO at Step 255) the CRP is suspended (Step 260) and the event logged (Step 265), for example, by the ransomware monitor 170 in the storage 120. Instead of suspending the CRP (Step 260), it can be terminated. The event log can include, for example, the CRP name, CRP cryptographic hash, its canonical path, a timestamp of when the CRP attempted to run on the OS, and a timestamp of when the CRP was terminated.

Referring to FIG. 3B, a determination can be made, for example, by the ransomware monitor 170, whether the process 200 is running in a client-server mode (Step 270). If the process 200 is determined not to be running in the client-server mode (NO at Step 270), then the suspended CRP can be terminated (Step 272) and an alert can be generated for the event (275). The generated alert can include event log data such as the terminated CRP process name, file path, cryptographic hash, SMA, date and time (Step 275). The alert can be rendered on a display device of the computing device 30 (shown in FIG. 1) or sent to a communication device (not shown) operated by, for example, a network security analyst.

If, however, the process 200 is determined to be running in the client-server mode (YES at Step 270), then the suspended CRP can be analyzed (Step 290) and a determination made whether to authorize it to run on the OS (Step 292). In analyzing the suspended CRP (Step 290), the process details for the suspended CRP can be sent to, for example, a server (not shown) for manual (or automatic) intervention and analysis (Step 290). If the suspended CRP is approved (YES at Step 292), then the CRP and its SMA can be logged and its SMA and process details stored, for example, in the CRP whitelist 175 (Step 294).

If the suspended CRP is disapproved or denied (NO at Step 292), then the CRP is terminated (Step 272) and an alert generated (Step 275).

The protect timer can be checked, for example, by the ransomware monitor 170 (shown in FIG. 2), to determine if the timer has finished or expired (Step 280). If it is determined that the protect timer has expired (YES at Step 280), then the operation mode for the process 200 can be changed to "learning mode" and the process 200 repeated in the "learning mode" beginning at Step 205. However, if it is determined that the protect timer has not expired (NO at Step 280), then the next CRP running or attempting to run on the OS can be checked (Step 245).

The terms "a," "an," and "the," as used in this disclosure, means "one or more," unless expressly specified otherwise.

The term "backbone," as used in this disclosure, means a transmission medium or infrastructure that interconnects one or more computing devices or communication devices to provide a path that conveys data packets and instruction signals between the one or more computing devices or communication devices. The backbone can include a network. The backbone can include an ethernet TCP/IP. The backbone can include a distributed backbone, a collapsed backbone, a parallel backbone or a serial backbone.

The term "bus," as used in this disclosure, means any of several types of bus structures that can further interconnect to a memory bus (with or without a memory controller), a peripheral bus, or a local bus using any of a variety of commercially available bus architectures. The term "bus" can include a backbone.

The terms "communicating device" or "communication device," as used in this disclosure, means any computing device, hardware, or computing resource that can transmit or receive digital or analog signals or data packets, or instruction signals or data signals over a communication link. The device can be portable or stationary.

The term "communication link," as used in this disclosure, means a wired or wireless medium that conveys data or information between at least two points. The wired or wireless medium can include, for example, a metallic conductor link, a radio frequency (RF) communication link, an Infrared (IR) communication link, or an optical communication link. The RF communication link can include, for example, WiFi, WiMAX, IEEE 802.11, DECT, 0G, 1G, 2G, 3G, 4G or 5G cellular standards, or Bluetooth. A communication link can include, for example, an RS-232, RS-422, RS-485, or any other suitable interface.

The terms "computer," "computing device," or "processor," as used in this disclosure, means any machine, device, circuit, component, or module, or any system of machines, devices, circuits, components, or modules that are capable of manipulating data according to one or more instructions. The terms "computer," "computing device" or "processor" can include, for example, without limitation, a processor, a microprocessor (X), a central processing unit (CPU), a graphic processing unit (GPU), an application specific integrated circuit (ASIC), a general purpose computer, a super computer, a personal computer, a laptop computer, a palmtop computer, a notebook computer, a desktop computer, a workstation computer, a server, a server farm, a computer cloud, or an array or system of processors, Xs, CPUs, GPUs, ASICs, general purpose computers, super computers, personal computers, laptop computers, palmtop computers, notebook computers, desktop computers, workstation computers, or servers.

The term "computer-readable medium," as used in this disclosure, means any non-transitory storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random-access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. The computer-readable medium can include a "cloud," which can include a distribution of files across multiple (e.g., thousands of) memory caches on multiple (e.g., thousands of) computers.

Various forms of computer readable media can be involved in carrying sequences of instructions to a computer. For example, sequences of instruction (i) can be delivered from a RAM to a processor, (ii) can be carried over a wireless transmission medium, or (iii) can be formatted according to numerous formats, standards or protocols, including, for example, WiFi, WiMAX, IEEE 802.11, DECT, 0G, 1G, 2G, 3G, 4G, or 5G cellular standards, or Bluetooth.

The terms "computer resource" or "computing resource," as used in this disclosure, means software, a software application, a web application, a web page, a computer application, a computer program, computer code, machine executable instructions, firmware, or a process that can be arranged to execute on a computing device or a communicating device.

The terms "computing resource process," "computer resource process" or "CR process," as used in this disclosure, means a computing resource that is in execution or in a state of being executed on an operating system or an operating system kernel of a computing device. Every computing resource that is created, opened or executed on or by the operating system can create a corresponding "CR process." A "computing resource process" or "CR process" can include one or more threads, as will be understood by those skilled in the art.

The term "database," as used in this disclosure, means any combination of software or hardware, including at least one computing resource or at least one computer. The database can include a structured collection of records or data organized according to a database model, such as, for example, but not limited to at least one of a relational model, a hierarchical model, or a network model. The database can include a database management system application (DBMS). The at least one application may include, but is not limited to, a computing resource such as, for example, an application program that can accept connections to service requests from communicating devices by sending back responses to the devices. The database can be configured to run the at least one computing resource, often under heavy workloads, unattended, for extended periods of time with minimal or no human direction.

The terms "including," "comprising" and variations thereof, as used in this disclosure, mean "including, but not limited to," unless expressly specified otherwise.

The term "network," as used in this disclosure means, but is not limited to, for example, at least one of a personal area network (PAN), a local area network (LAN), a wireless local area network (WLAN), a campus area network (CAN), a metropolitan area network (MAN), a wide area network (WAN), a metropolitan area network (MAN), a wide area network (WAN), a global area network (GAN), a broadband area network (BAN), a cellular network, a storage-area network (SAN), a system-area network, a passive optical local area network (POLAN), an enterprise private network (EPN), a virtual private network (VPN), the Internet, or the like, or any combination of the foregoing, any of which can be configured to communicate data via a wireless and/or a wired communication medium. These networks can run a variety of protocols, including, but not limited to, for example, Ethernet, IP, IPX, TCP, UDP, SPX, IP, IRC, HTTP, FTP, Telnet, SMTP, DNS, ARP, ICMP.

The term "node," as used in this disclosure, means a physical or virtual location in a computer network that comprises or can comprise a computer resource asset.

The term "server," as used in this disclosure, means any combination of software or hardware, including at least one computing resource or at least one computer to perform services for connected communicating devices as part of a client-server architecture. The at least one server application can include, but is not limited to, a computing resource such as, for example, an application program that can accept connections to service requests from communicating devices by sending back responses to the devices. The server can be configured to run the at least one computing resource, often under heavy workloads, unattended, for extended periods of time with minimal or no human direction. The server can include a plurality of computers configured, with the at least one computing resource being divided among the computers depending upon the workload. For example, under light loading, the at least one computing resource can run on a single computer. However, under heavy loading, multiple computers can be required to run the at least one computing resource. The server, or any if its computers, can also be used as a workstation.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential or a parallel order, such processes, methods and algorithms may be configured to work in alternate orders. In other words, any sequence or order of steps that may be described in a sequential order does not necessarily indicate a requirement that the steps be performed in that order; some steps may be performed simultaneously. Similarly, if a sequence or order of steps is described in a parallel (or simultaneous) order, such steps can be performed in a sequential order. The steps of the processes, methods or algorithms described herein may be performed in any order practical.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A computer-implemented method for preventing malware from infecting a computing device or a computer resource on the computing device, the method comprising:

providing an authorized processes database including a computer resource process (CRP) whitelist;

performing a cybersecurity threat remediation process;

checking the case that the cybersecurity threat remediation process is in a learning mode or a protect mode;

in the case that the cybersecurity threat remediation process is in the learning mode:

(a) initializing a learn timer;

(b) detecting a computer resource process running or attempting to run on an operating system;

(c) comparing details of the computer resource process against the authorized processes database containing details of previously run computer resources processes to determine if the computer resource process is running or attempting to run for a first time on the operating system;

(d) automatically adding the details of the computer resource process to the authorized processes database when it is determined that the computer resource process is running for the first time or attempting to run for the first time on the operating system; and (e) in the case that the learn timer stops, changing from the learning mode to the protect mode and performing steps (f)-(i); and in the case that the cybersecurity threat remediation process is in the protect mode:

(f) initializing a protect timer;

(g) disabling an adding of the details of the computer resource (g) process to the CRP whitelist;

(h) suspending the computer resource process from running on the operating system when it is determined that the computer resource process is running or attempting to run for the first time on the operating system; and (i) in the case that the protect timer stops, changing from the protect mode to the (i) learning mode and performing steps (a)-(e), wherein the details of the computer resource process include at least one of semaphore data, mutex data or atom data for the computer resource process.

2. The computer-implemented method in claim 1, the method further comprising:

terminating the computer resource process.

3. The computer-implemented method in claim 1, the method further comprising:

generating an alert for the computer resource process, including the details of the computer resource process.

4. The computer-implemented method in claim 1, the method further comprising:

checking, during the protect mode, if the computing device is operating in a client-server mode; and generating an alert for the computer resource process, including the details of the computer resource process when the computing device is operating in the client-server mode.

5. The computer-implemented method in claim 1, the method further comprising:

analyzing, during the protect mode, the details of the computer resource process; and terminating, during the protect mode, the computer resource process based on a result of the analysis.

6. The computer-implemented method in claim 1, the method further comprising:

analyzing, during the protect mode, the details of the computer resource process; and allowing, during the protect mode, the computer resource process to run on the operating system based on a result of the analysis.

7. The computer-implemented method in claim 1, the method further comprising:

adding, during the learning mode, the details of the computer resource process to the CRP whitelist of the authorized processes database.

8. The computer-implemented method in claim 1, the method further comprising:

sending, during the protect mode, the details of the computer resource process to another computing device for analysis;

receiving an analysis result from said another computing device; and either terminating the computer resource process or allowing the computer resource process to run on the operating system based on the analysis result.

9. The computer-implemented method in claim 1, wherein the details of the computer resource process further include at least one of a process name, a file path, a cryptographic hash, or timestamp.

10. The computer-implemented method in claim 1, wherein the malware comprises crypto-ransomware.

11. A system for preventing malware from infecting a computing device or a computer resource on the computing device, the system comprising:

a processor running an operating system;

an authorized processes database including a computer resource process (CRP) whitelist containing details of previously run computer resources processes; and a ransomware monitor configured to perform a cybersecurity threat remediation process in a learning mode or a protect mode, the ransomware monitor being arranged to:

check the case that the cybersecurity threat remediation process is in the learning mode or the protect mode;

in the case that the cybersecurity threat remediation process is in the learning mode:

(a) initialize a learn timer;

(b) detect a computer resource process running or attempting to run on the processor;

(c) compare details of the computer resource process against the authorized processes database to determine if the computer resource process is running or attempting to run for a first time on the processor;

(d) automatically add the details of the computer resource process to the authorized processes database when it is determined that the computer resource process is running for the first time or attempting to run for the first time on the operating system;

(e) in the case that the learn timer stops, change from the learning mode to the protect mode and perform steps (f)-(i); and in the case that the cybersecurity threat remediation process is in the protect mode;

(f) initialize a protect timer;

(g) disable an adding of the details of the computer resource process to the CRP whitelist; and (h) suspend the computer resource process from running on the processor when it is determined that the computer resource process is running or attempting to run for the first time on the processor; and (i) in the case that the protect timer stops, change from the protect mode to the learning mode and perform steps (a)-(e).

12. The system in claim 11, wherein the details of the computer resource process include at least one of semaphore data, mutex data or atom data for the computer resource process.

13. The system in claim 11, wherein the details of the computer resource process further include at least one of a process name, a file path, a cryptographic hash, or timestamp.

14. The system in claim 11, wherein the authorized processes database includes a mutex table containing a mutex value for each of the previously run computer resources processes.

15. The system in claim 11, wherein the authorized processes database includes a semaphore table containing a semaphore value for each of the previously run computer resources processes.

16. The system in claim 11, wherein the ransomware monitor is further arranged to:

check, during the protect mode, if the computing device is operating in a client-server mode; and
 generate an alert for the computer resource process, including the details of the computer resource process when the computing device is operating in the client-server mode.

17. The system in claim 11, wherein the ransomware monitor is further arranged to:

send, during the protect mode, the details of the computer resource process to another computing device for analysis;
 receive an analysis result from said another computing device; and
 either, based on the analysis result, terminate the computer resource process or allow the computer resource process to run on the processor.

\* \* \* \* \*